F. LOWRY.
VALVE.
APPLICATION FILED JUNE 30, 1916.
1,334,870.
Patented Mar. 23, 1920.
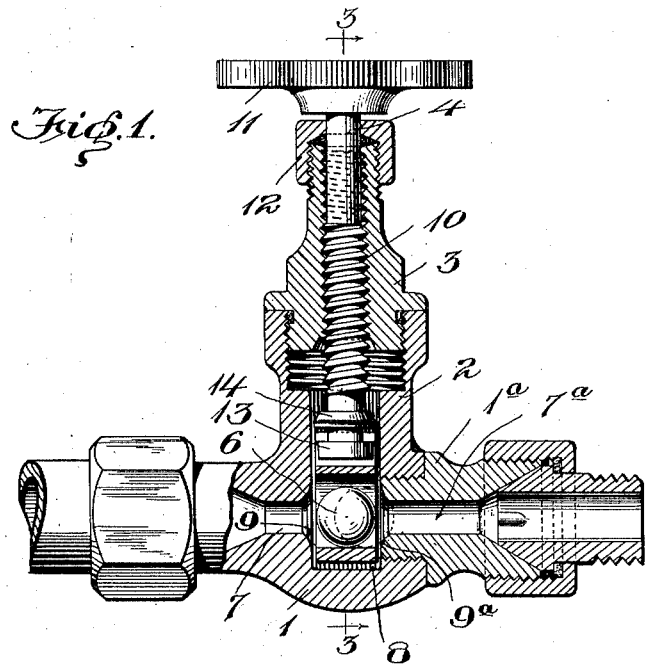
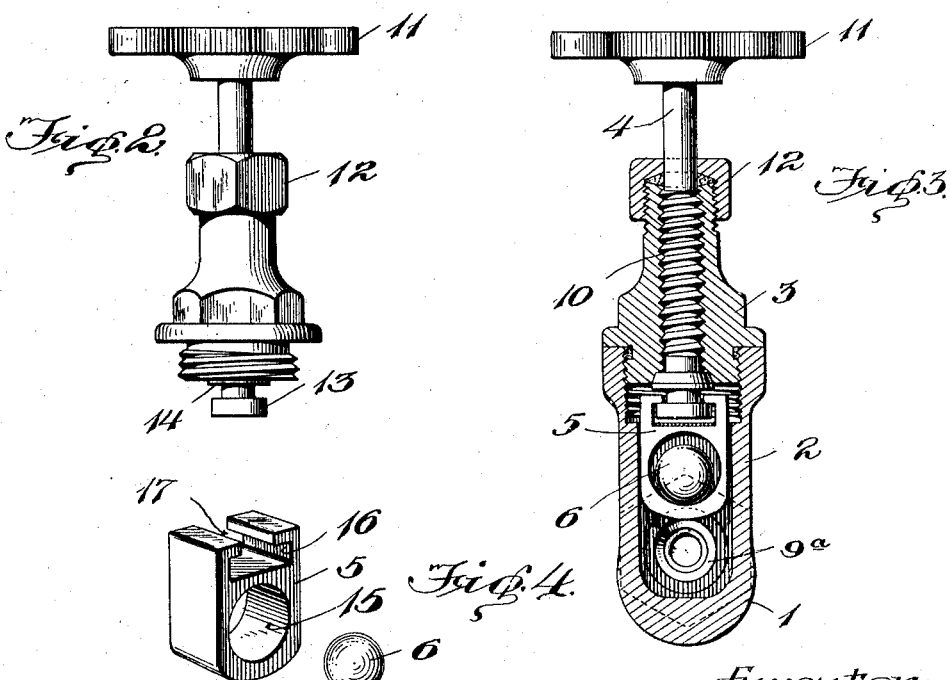
Witness:
Ernest C. Crocker
Inventor:
Frank Lowry
By Harry Frease
Attorney

UNITED STATES PATENT OFFICE.

FRANK LOWRY, OF LOUDONVILLE, OHIO, ASSIGNOR TO THE OHIO GREASE COMPANY, OF LOUDONVILLE, OHIO, A CORPORATION OF OHIO.

VALVE.

1,334,870.　　　　　Specification of Letters Patent.　　Patented Mar. 23, 1920.

Application filed June 30, 1916. Serial No. 106,825.

*To all whom it may concern:*

Be it known that I, FRANK LOWRY, a citizen of the United States, residing at Loudonville, in the county of Ashland and State of Ohio, have invented certain new and useful Improvements in Valves, of which the following is a specification.

The invention relates to valves of the type having a straightway through passage with a valve member for stopping the flow of fluid in either direction; and the object of the improvement is to provide a construction and arrangement in which the valve member is operated from one position to another with a minimum of resistance, and with a negligible wear of the parts.

Valves of this type, generally known as gate valves, by reason of their extensive bearing surfaces, are subject to considerable frictional contact and consequent wear of the parts; and for the same reason it is practically impossible to obtain and maintain a complete or sealing bearing of the valve upon its flat seat.

These difficulties are overcome, in the present invention, by the use of a valve case having a straightway through passage extending each way from a central valve chamber, in each side of which is provided an annular valve seat at the opening of the corresponding passage; and by providing a ball valve freely carried in a through opening in a movable block carriage swiveled on the inner end of the valve stem, by means of which the ball valve may be moved into and out of the valve chamber for closing against the seat on either one side or the other thereof, or for entirely clearing the through passage.

A preferred embodiment of the invention is illustrated in the accompanying drawings, forming part hereof, in which—

Figure 1 is a longitudinal sectional view through the median line of the valve, with the valve member in operative position;

Fig. 2, a side elevation of the valve head and stem detached;

Fig. 3, a transverse sectional view on line 3—3, of Fig. 1, with the valve member in inoperative position; and Fig. 4, a detached perspective view of the valve carriage and ball valve.

Similar numerals refer to similar parts throughout the drawings.

The valve as a whole consists of the tubular casing 1, having the neck 2 extending radially from one side thereof, the head 3 screw-threaded into the upper end of the neck, the screw-threaded valve stem 4 extending through the head into the neck, and the movable member or carriage 5 swiveled on the inner end of the stem and carrying the cylindrical valve member or ball 6.

The hollow valve casing 1 is provided with the through longitudinal passage 7 and with the central chamber 8 formed transversely of the through passage and extending outward into the neck 2 and into the opposite side wall of the case to form the guideway for the movable carriage 5. The diameter of the passage 7 is preferably restricted at each side of the chamber 8 to a size slightly less than the diameter of the ball 6, and the peripheral edges of the passageway at the sides of the recess are beveled either conically or spherically to form the annular valve seats 9 and 9ª.

The valve stem 4 extends inwardly into the neck 2 and chamber 8 through a screw threaded opening 10 in the head 3 and is provided on its outer end with a suitable hand wheel 11, the usual packing nut 12 being provided on the outer end of the head around the stem; and on the inner end of the stem between a head 13 and a collar 14 formed integrally therewith and spaced a short distance apart is swiveled the carriage 5.

The swiveled carriage 5, which may be of any desired shape, in the present instance is in the form of a rectangular block, of a size adapted to loosely slide endwise in the chamber 8, which is also rectangular in form to prevent a rotation of the carriage on its axis; and is provided with the through transverse cylindric opening 15 adapted to loosely receive and carry the ball 6. The opening 15 is so positioned in the carriage that when the carriage is in its inner position, the ball 6 will be supported in axial alinement with the passage 7 and is thus free to be seated upon either of the valve seats 9 or 9ª by fluid pressure tending to flow through the valve in one direction or the other.

And the parts are so arranged that when the carriage is in its outer position it is entirely clear of the line of the straightway through passage 7; so that there is no restriction or deflection whatever of the flow of fluid through the same.

For the purpose of swiveling the carriage on the inner end of the valve stem, the outer end thereof is provided with a slot 16 for receiving the head 13, the outer wall of the slot being provided with a slit 17 for receiving the portion of the stem between the head and collar. The outer wall of the carriage thus bears between the head and collar, so that the carriage may be moved transversely of the passage 7, in either direction, by means of the hand wheel 11.

For convenience in construction, as shown in Fig. 1, the casing 1 may be made in two parts, one end portion thereof being made separately in the form of a shouldered bushing 1ª screw threaded into the other portion of the casing slightly to one side of its center which bushing is provided with a longitudinal opening 7ª extending therethrough forming part of the passageway 7, and the inner end thereof forms the valve seat 9ª for the ball 6.

It will be readily understood that when the carriage 5 is in its inner or operative position, the pressure of the fluid tending to flow through the valve in either direction will force the ball 6 against one of the seats 9 or 9ª, which will thus stop or check the flow of liquid through the valve; and that because of the floating nature of the carriage, due to the looseness with which it fits its slideway, the pressure of the fluid will be exerted against the ball only, thus eliminating any unnecessary wear.

When the the stem is operated to open or close the valve, the ball is shifted onto or from its position on its seat, by the carriage, with a rolling movement, which facilitates the operation of the valve, and also prevents an abrasion of the parts. Furthermore just as soon as the seal of the ball valve on the seat is broken, the pressure of the fluid operating equally in all directions, serves to float the valve freely in its carriage, and permits the further movement of the same to its outer position without any resistance.

I claim:—

1. A valve case having a through passage with a chamber therein and an annular valve seat at the side of the chamber at the opening of the passage, a non-rotatable carriage movable endwise into and clear out of the line of the passage having a through cylindric opening therein, and a ball valve freely carried in the opening of the carriage for seating in the opening of the passage.

2. A valve case having a through passage with a chamber therein and an annular valve seat on each side of the chamber at the openings of the passage, a non-rotatable carriage movable endwise into and clear out of the line of the passage having a through opening therein, and a ball valve freely carried in the opening for seating in either opening of the passage.

3. A valve case having a through passage with a chamber therein and an annular valve seat at the side of the chamber at the opening of the passage and a laterally extending guideway, a valve stem, a non-rotatable carriage swiveled on the valve stem movable endwise in the guideway into and clear out of the line of the passage and having a through opening to aline with the passage, and a ball valve freely carried in the opening of the carriage for seating in the opening of the passage.

4. A valve case having a through passage with a chamber therein and an annular valve seat on each side of the chamber at the openings of the passage and a laterally extending guideway, a valve stem, a non-rotatable carriage swiveled on the valve stem movable endwise in the guideway into and clear out of the line of the passage and having a through opening to aline with the passage, and a ball valve freely carried in the opening for seating in either opening of the passage.

FRANK LOWRY.